(12) United States Patent
Huang et al.

(10) Patent No.: US 7,706,114 B2
(45) Date of Patent: Apr. 27, 2010

(54) ESD AVOIDING CIRCUITS BASED ON THE ESD DETECTORS IN A FEEDBACK LOOP

(75) Inventors: Shao-Chang Huang, Hsinchu (TW); Chiun-Chi Shen, Hsin-Chu Hsien (TW); Hsin-Ming Chen, Tainan Hsien (TW)

(73) Assignee: eMemory Technology Inc., Hsinchu (TW)

( * ) Notice: Subject to any disclaimer, the term of this patent is extended or adjusted under 35 U.S.C. 154(b) by 446 days.

(21) Appl. No.: 11/867,003

(22) Filed: Oct. 4, 2007

(65) Prior Publication Data

US 2009/0091870 A1    Apr. 9, 2009

(51) Int. Cl.
*H02H 9/00* (2006.01)
(52) U.S. Cl. .......................................... 361/56
(58) Field of Classification Search ........... 361/56
See application file for complete search history.

(56) References Cited

U.S. PATENT DOCUMENTS

| 6,396,300 | B1 * | 5/2002 | Loughmiller et al. | 326/16 |
|---|---|---|---|---|
| 6,614,262 | B2 * | 9/2003 | Kunz et al. | 326/81 |
| 6,822,475 | B2 * | 11/2004 | Loughmiller | 326/16 |
| 7,098,694 | B2 * | 8/2006 | Bhattacharya et al. | 326/81 |
| 7,196,544 | B2 * | 3/2007 | Loughmiller | 326/38 |
| 7,271,627 | B2 * | 9/2007 | Chen | 327/108 |
| 7,388,410 | B2 * | 6/2008 | Kim et al. | 327/108 |
| 7,430,100 | B2 * | 9/2008 | Bhattacharya et al. | 361/91.1 |
| 7,660,087 | B2 * | 2/2010 | Huang et al. | 361/56 |
| 2004/0046591 | A1 * | 3/2004 | Loughmiller | 326/101 |
| 2006/0103427 | A1 * | 5/2006 | Bhattacharya et al. | 326/83 |
| 2006/0176076 | A1 * | 8/2006 | Loughmiller | 326/38 |
| 2007/0019348 | A1 * | 1/2007 | Bhattacharya et al. | 361/91.1 |
| 2007/0109016 | A1 * | 5/2007 | Loughmiller | 326/38 |
| 2007/0247771 | A1 * | 10/2007 | Chen | 361/56 |
| 2008/0123228 | A1 * | 5/2008 | Hung | 361/56 |
| 2008/0316660 | A1 * | 12/2008 | Huang et al. | 361/56 |
| 2009/0296295 | A1 * | 12/2009 | Ker et al. | 361/56 |
| 2009/0303646 | A1 * | 12/2009 | Huang et al. | 361/58 |

* cited by examiner

*Primary Examiner*—Ronald W Leja
(74) *Attorney, Agent, or Firm*—Winston Hsu (57) ABSTRACT

When an electrostatic discharge event occurs to a connection pad of a chip, an electrostatic discharge detector layout in a feedback loop is able to detect an induced electrostatic discharge voltage for generating a control signal. A pass transistor can be turned off by the control signal for isolating the induced electrostatic discharge voltage, and the internal circuit of the chip can be protected from being damaged by the induced electrostatic discharge voltage. Furthermore, the designed circuit based on electrostatic discharge isolation technique for protecting the internal circuit of the chip is compatible with programmable circuits, and the connection pad can be furnished with burning signals or logic signals.

24 Claims, 8 Drawing Sheets

ESD AVOIDING CIRCUITS BASED ON THE ESD DETECTORS IN A FEEDBACK LOOP

BACKGROUND OF THE INVENTION

1. Field of the Invention

The present invention relates in general to ESD avoiding circuits, and more particularly, to the ESD avoiding circuits based on the ESD detectors in a feedback loop.

2. Description of the Prior Art

Since the complementary metal-oxide semiconductor (CMOS) production technology has advanced well into the deep-submicron and nanometer scale, integrated circuit (IC) performance has risen correspondingly. Nowadays, many integrated circuits are guided into mass production by the CMOS process. Some advanced process technologies for scaling-down device areas within integrated circuits, such as thinner gate-oxide and shallower drain/source, can effectively increase the integration and improve the characteristics of the devices. However, these advanced process technologies also significantly sacrifice the electrostatic discharge (ESD) robustness of the integrated circuit. Therefore, the ESD is more likely to become a bottleneck in the mass production yield rate of integrated circuits.

Figure 1:
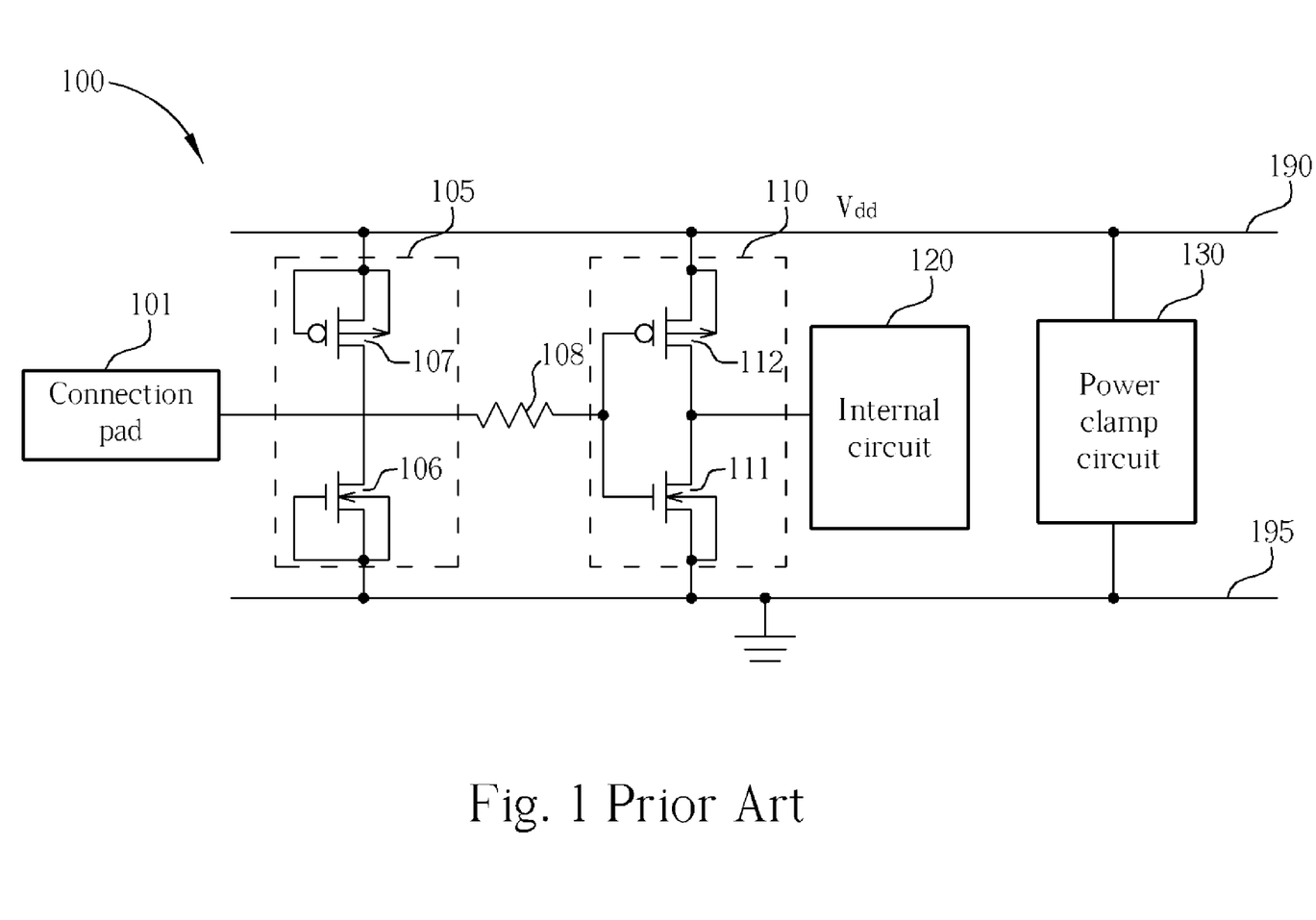
FIG. 1 is a schematic circuit diagram showing the structure of a prior art ESD protection circuit in an integrated circuit.

Please refer to FIG. 1, which is a schematic circuit diagram showing the structure of a prior art ESD protection circuit in an integrated circuit 100. The integrated circuit 100 comprises a connection pad 101, an input resistor 108, an internal circuit 120, a power clamp circuit 130, an input ESD protection circuit 105, and an input inverter 110. The input ESD protection circuit 105 comprises an NMOS transistor 106 and a PMOS transistor 107. The input ESD protection circuit 105 functions to perform an ESD protecting process between the connection pad 101 and a power terminal 190 as well as between the connection pad 101 and a ground terminal 195. The power terminal 190 and the ground terminal 195 can be a power route and a ground route respectively in the integrated circuit 100.

The power clamp circuit 130 functions to perform an ESD protecting process between the power terminal 190 and the ground terminal 195. The input inverter 110 comprises an NMOS transistor 111 and a PMOS transistor 112. The input inverter 110 is coupled between the input resistor 108 and the internal circuit 120. The resistor 108 in conjunction with the MOS capacitors of the MOS transistors 111, 112 functions to act as a resistor-capacitor circuit for providing a further ESD protection. The ESD protection circuit 105 and the power clamp circuit 130 are utilized to protect the internal circuit 120 based on discharging the ESD induced current. That is, when an ESD event occurs to the connection pad 101, the power terminal 190 or the ground terminal 195, the NMOS transistor 106, the PMOS transistor 107 or the power clamp circuit 130 is turned on or activated to efficiently guide any ESD induced current into a bypass path instead of into the internal circuit 120.

However, when the internal circuit 120 comprises a programmable circuit and a burning signal for programming the programmable circuit is furnished via the connection pad 101, the prior art ESD protection circuit of the integrated circuit 100 is not compatible with the programming requirement in that a parasitic diode structured by the junction between the drain and the channel well of the PMOS transistor 107 will clamp the voltage range of the burning signal within the supply voltage Vdd at the power terminal 190.

Figure 2:
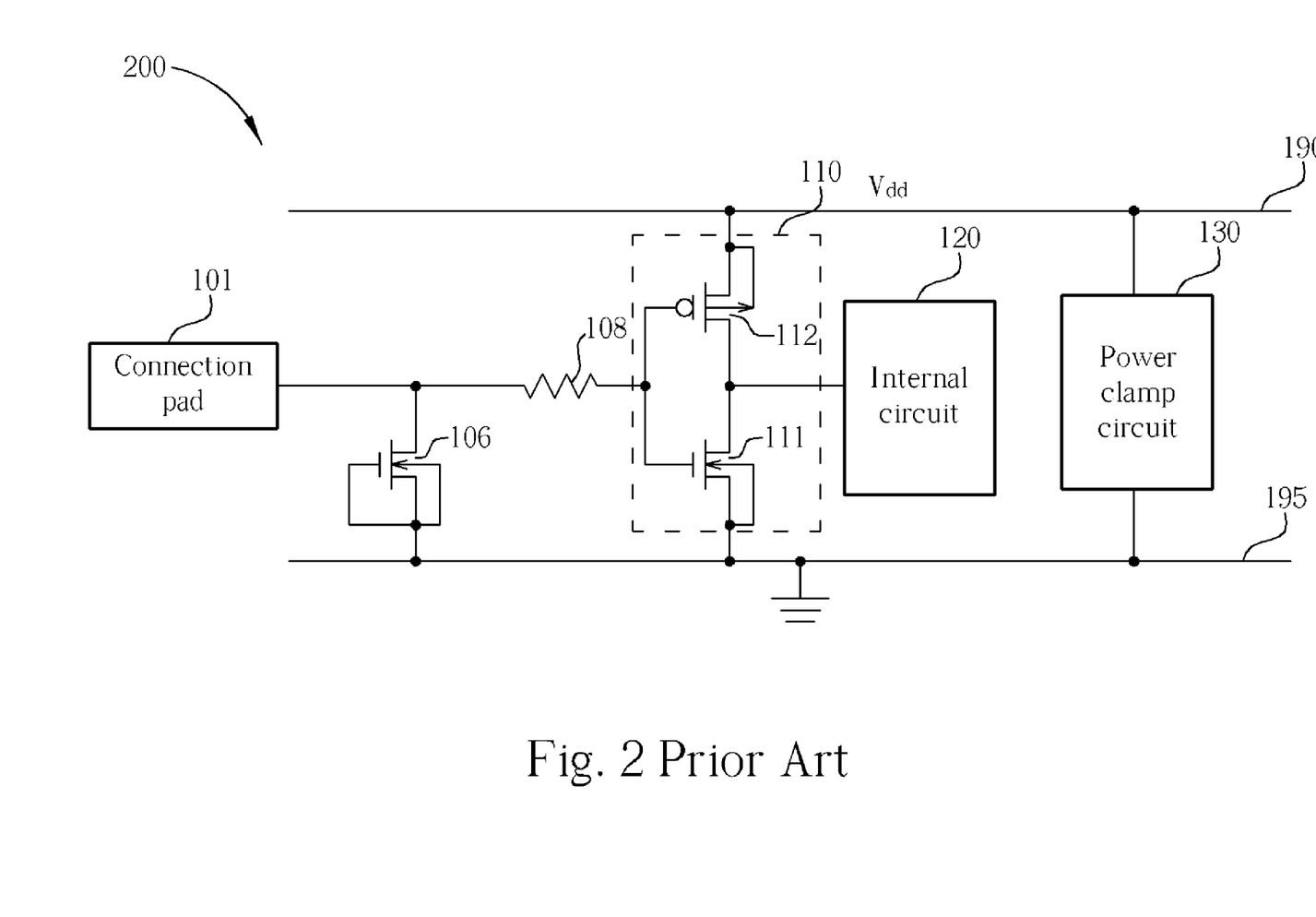
FIG. 2 is a schematic circuit diagram showing the structure of a prior art ESD protection circuit in an integrated circuit with programmable functionality.

Please refer to FIG. 2, which is a schematic circuit diagram showing the structure of a prior art ESD protection circuit in an integrated circuit 200 with programmable functionality. It is obvious that the PMOS transistor 107 in FIG. 1 is removed so that the voltage range of the burning signal at the connection pad 101 is allowed to be greater than the supply voltage Vdd. The protection functionality concerning the PMOS transistor 107 is then replaced by the functional operation concerning the parasitic transistor of the NMOS transistor 106 in conjunction with the power clamp circuit 130. Accordingly, both the ESD protection circuits shown in FIG. 1 and FIG. 2 perform an ESD protecting process based on discharging the ESD induced current. However, when the amount of charges being accumulated instantaneously at the connection pad 101 is so great that even the ESD protecting process cannot release the accumulated charges soon enough, the ESD induced current can be furnished to the internal circuit 120, which will cause the internal circuit 120 to be damaged by the ESD induced current.

SUMMARY OF THE INVENTION

In accordance with an embodiment of the present invention, an ESD avoiding circuit for avoiding passing an electrostatic discharge voltage induced on a connection pad to an internal circuit. The ESD avoiding circuit comprises a first transistor and an ESD detector. The ESD detector comprises a second transistor, a third transistor, and a fourth transistor. The first transistor has a source coupled to the connection pad, a drain coupled to the internal circuit, a gate, and a channel well. The ESD detector is coupled to the first transistor for providing a control signal to the gate of the first transistor. The second transistor has a source coupled to the connection pad, a channel well coupled to the source, a gate coupled to the internal circuit, and a drain coupled to the gate of the first transistor. The third transistor has a source coupled to a ground terminal, a channel well coupled to the source, a gate coupled to the internal circuit, and a drain coupled to the gate of the first transistor. The fourth transistor has a source coupled to the ground terminal, a channel well coupled to the source, a gate coupled to a power terminal, and a drain coupled to the gate of the first transistor.

The present invention further provides an ESD protection circuit for protecting an internal circuit against an electrostatic discharge voltage induced on a connection pad. The ESD protection circuit comprises a first transistor, an ESD detector, and a fifth transistor. The ESD detector comprises a second transistor, a third transistor, and a fourth transistor. The first transistor has a source coupled to the connection pad, a drain coupled to the internal circuit, a gate, and a channel well. The ESD detector is coupled to the first transistor for providing a control signal to the gate of the first transistor. The second transistor has a source coupled to the connection pad, a channel well coupled to the source, a gate coupled to the internal circuit, and a drain coupled to the gate of the first transistor. The third transistor has a source coupled to a ground terminal, a channel well coupled to the source, a gate coupled to the internal circuit, and a drain coupled to the gate of the first transistor. The fourth transistor has a source coupled to the ground terminal, a channel well coupled to the source, a gate coupled to a power terminal, and a drain coupled to the gate of the first transistor. The fifth transistor has a source coupled to the ground terminal, a channel well coupled to the source, a gate coupled to the source, and a drain coupled to the connection pad.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 3:
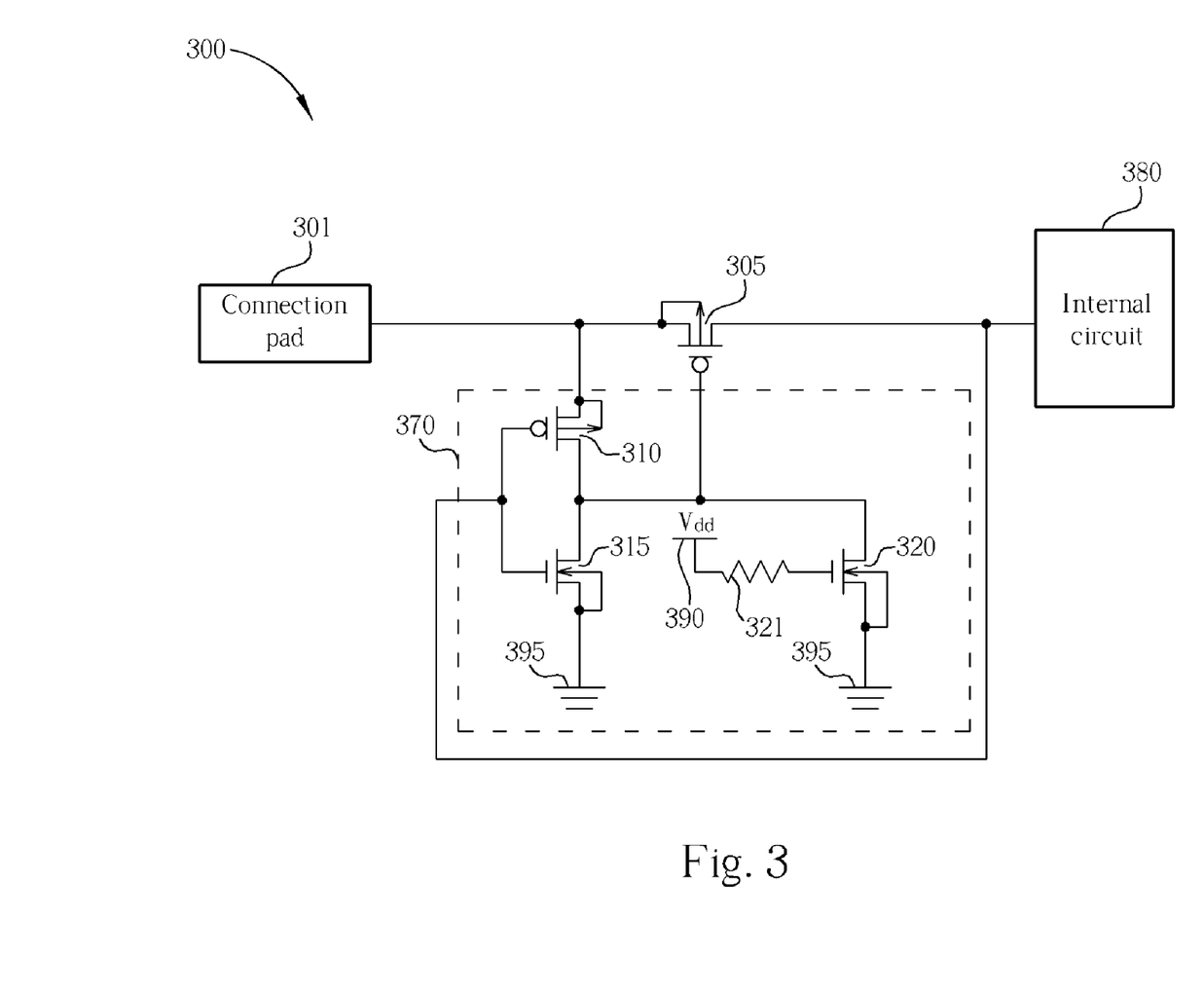
FIG. 3 is a schematic circuit diagram showing the structure of an ESD avoiding circuit in an integrated circuit in accordance with a first embodiment of the present invention.

Please refer to FIG. 3, which is a schematic circuit diagram showing the structure of an ESD avoiding circuit in an integrated circuit 300 in accordance with a first embodiment of the present invention. The integrated circuit 300 comprises a connection pad 301, a first transistor 305, an ESD detector 370 and an internal circuit 380. The ESD avoiding circuit in FIG. 3 comprises the first transistor 305 and the ESD detector 370. The ESD detector 370 comprises a second transistor 310, a third transistor 315, a fourth transistor 320 and a resistor 321.

The first transistor 305 has a source coupled to the connection pad 301, a drain coupled to the internal circuit 380, a gate coupled to the ESD detector 370, and a channel well. The channel well of the first transistor 305 can be coupled to the source of the first transistor 305 or a power terminal 390. The first transistor 305 is a PMOS transistor, and the channel well of the first transistor 305 is an N-type doped well. The ESD detector 370 is capable of detecting an ESD event occurring to the connection pad 301 and provides a control signal for controlling on/off states of the first transistor 305. That is, the first transistor 305 functions to act as a pass transistor under control by the ESD detector 370.

The second transistor 310 has a source coupled to the connection pad 301, a channel well coupled to the source, a gate coupled to the internal circuit 380, and a drain coupled to the gate of the first transistor 305. The second transistor 310 is a PMOS transistor. The third transistor 315 has a source coupled to a ground terminal 395, a channel well coupled to the source, a gate coupled to the internal circuit 380, and a drain coupled to the gate of the first transistor 305. The third transistor 315 is an NMOS transistor, and the channel well of the third transistor 315 is a P-type doped well.

The fourth transistor 320 has a source coupled to the ground terminal 395, a channel well coupled to the source, a gate coupled to the resistor 321, and a drain coupled to the gate of the first transistor 305. The fourth transistor 320 is an NMOS transistor. The resistor 321 is coupled between the power terminal 390 and the gate of the fourth transistor 320. In a preferred embodiment, the fourth transistor 320 is a MOS transistor having thin or thick gate oxide layer, and the first through third transistors 305, 310 and 315 are MOS transistors having thick gate oxide layer.

The operations concerning the ESD avoiding circuit of the integrated circuit 300 under normal operating situation and under occurrence of an ESD event are detailed as the following. Under normal operating situation, the power terminal 390 is powered with the supply voltage Vdd, and the ground terminal 395 is grounded. Since the gate of the fourth transistor 320 is furnished with the supply voltage Vdd, the fourth transistor 320 is turned on, and the control signal is switched to become a ground signal. The first transistor 305 is then turned on by the control signal having a ground potential.

When a low logic signal is furnished to the connection pad 301, the low logic signal can be transferred to the internal circuit 380 via the first transistor 305. Meanwhile, the low logic signal is also furnished backwards to the gates of the second and third transistors 310, 315, which will turn on the second transistor 310 and turn off the third transistor 315. Under such circumstance, the low logic signal is also furnished to the gate of the first transistor 305 via the second transistor 310. That is, the control signal can be the ground signal furnished via the fourth transistor 320 or the low logic signal furnished via the second transistor 310, which actually forms a self-consistent operation.

When a high logic signal is furnished to the connection pad 301, the high logic signal can be transferred to the internal circuit 380 via the first transistor 305. Meanwhile, the high logic signal is also furnished backwards to the gates of the second and third transistors 310, 315, which will turn off the second transistor 310 and turn on the third transistor 315. Under such circumstance, the ground signal is also furnished to the gate of the first transistor 305 via the third transistor 315. That is, the control signal is the ground signal furnished via the fourth transistor 320 or the third transistor 315, which also forms a self-consistent operation. Please note that the voltage range of the high logic signal is not clamped to within the supply voltage Vdd, which means that a burning signal having a voltage greater than the supply voltage Vdd is allowed to be transferred to the internal circuit 380 via the connection pad 301. In other words, the connection pad 301 is allowed to receive logic signals for logic operations or burning signals for programming operations. For that reason, the ESD avoiding circuit shown in FIG. 3 is compatible with the internal circuit 380 having programmable functionality.

The ESD event is occurred when the connection pad 301, the power terminal 390 and the ground terminal 395 are all floated if they are not grounded. The floating terminal is easy to be coupled to the zero voltage (ground terminal). Accordingly, the first through fourth transistors 305, 310, 315 and 320 are retained in the off state before the occurrence of ESD events. When an ESD event having a positive induced voltage relative to the ground terminal 395 occurs to the connection pad 301 and the positive induced voltage is furnished to the source of the second transistor 310, the second transistor 310 will be turned on due to the floating point. Accordingly, the voltage of the control signal furnished to the gate of the first transistor 305 will become the positive induced voltage. That is, the control signal having the positive induced voltage is fed to the gate of the first transistor 305 so as to retain the first transistor 305 in the off state. As a result, the first transistor 305 is capable of isolating the positive induced voltage concerning the ESD event for protecting the internal circuit 380 from being damaged. On the other hand, when an ESD event having a negative induced voltage relative to the ground terminal 395 occurs to the connection pad 301 and the negative induced voltage is furnished to the source of the first transistor 305, the first transistor 305 is still retained to hold the off state, and the first transistor 305 is also capable of isolating the negative induced voltage concerning the ESD event for protecting the internal circuit 380 from being damaged.

Furthermore, when an ESD event having an induced voltage occurs to the power terminal 390, the gate oxide layers of the first and fourth transistors 305, 320 is able to isolate the induced voltage concerning the ESD event for protecting the internal circuit 380 from being damaged. Still more, when an ESD event having an induced voltage occurs to the ground terminal 395, the first and second transistors 305, 310 is able to isolate the induced voltage concerning the ESD event for protecting the internal circuit 380 from being damaged. In summary, the ESD avoiding circuit in the integrated circuit 300 is able to isolate the induced voltage concerning the ESD event for protecting the internal circuit 380 from being damaged, and is also compatible with the internal circuit 380 having programmable functionality.

Figure 4:
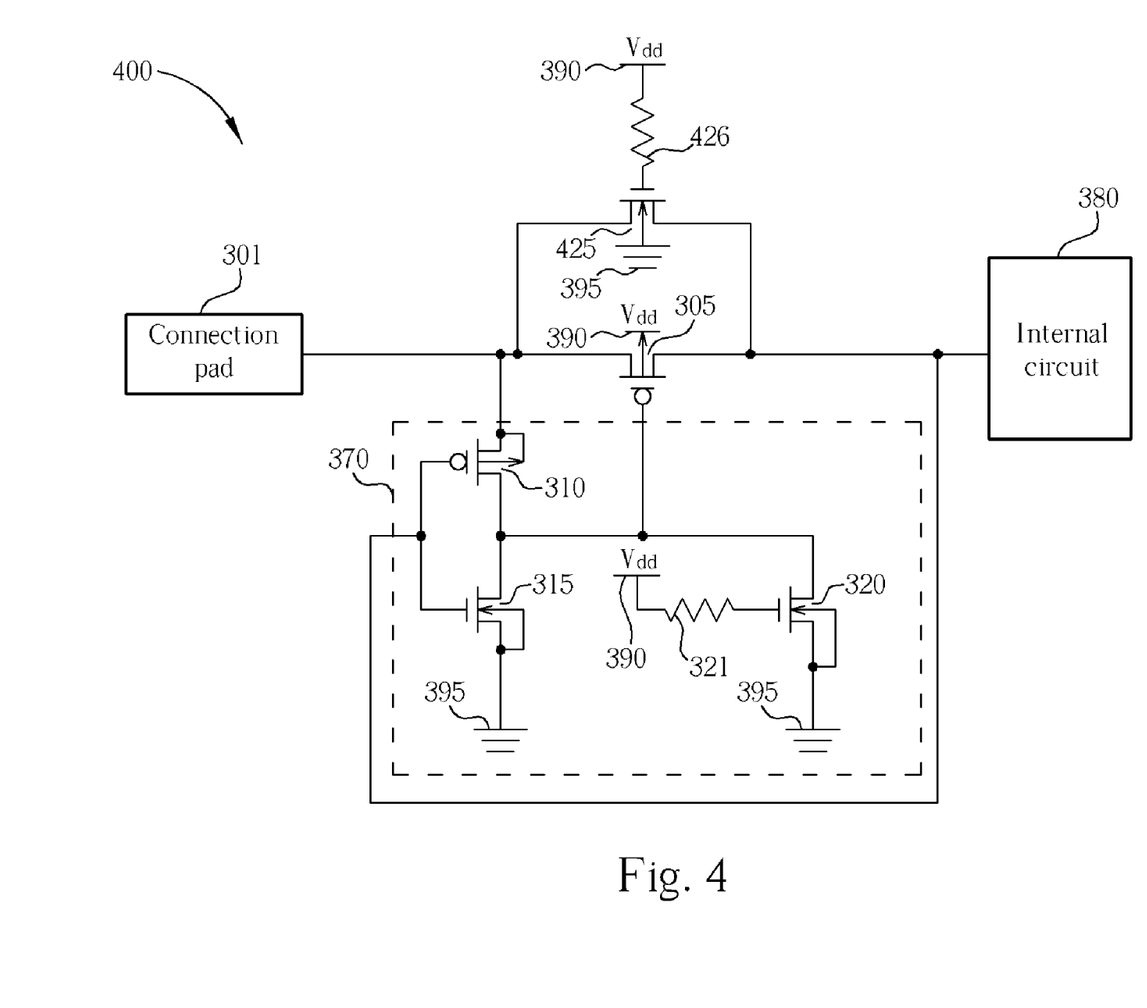
FIG. 4 is a schematic circuit diagram showing the structure of an ESD avoiding circuit in an integrated circuit in accordance with a second embodiment of the present invention.

Please refer to FIG. 4, which is a schematic circuit diagram showing the structure of an ESD avoiding circuit in an integrated circuit 400 in accordance with a second embodiment of the present invention. The integrated circuit 400 comprises a connection pad 301, a first transistor 305, an ESD detector 370, a fifth transistor 425, a resistor 426 and an internal circuit 380. The ESD avoiding circuit in FIG. 4 comprises the first transistor 305, the fifth transistor 425, the resistor 426 and the ESD detector 370. The ESD detector 370 comprises a second transistor 310, a third transistor 315, a fourth transistor 320 and a resistor 321. The first transistor 305 has a source coupled to the connection pad 301, a drain coupled to the internal circuit 380, a gate coupled to the ESD detector 370, and a channel well coupled to the power terminal 390.

The fifth transistor 425 has a source coupled to the connection pad 301, a drain coupled to the internal circuit 380, a gate coupled to resistor 426, and a channel well coupled to the ground terminal 395. The fifth transistor 425 is an NMOS transistor having thick gate oxide layer. The fifth transistor 425 is able to provide a signal transmission path having lower resistance and higher transmission rate between the connection pad 301 and the internal circuit 380 under normal operating situation in that the NMOS transistor is superior to the PMOS transistor in channel resistance and transmission rate. The resistor 425 is coupled between the gate of the fifth transistor 425 and the power terminal 390. The circuit connections concerning the other elements in the ESD avoiding circuit of the integrated circuit 400 are similar to the circuit connections detailed for the integrated circuit 300 in FIG. 3, and for the sake of brevity, further description on the circuit connections in FIG. 4 is omitted.

The operations concerning the ESD avoiding circuit of the integrated circuit 400 under normal operating situation and under occurrence of an ESD event are detailed as the following. Under normal operating situation, the power terminal 390 is powered with the supply voltage Vdd, and the ground terminal 395 is grounded. Since the gate of the fourth transistor 320 is furnished with the supply voltage Vdd, the fourth transistor 320 is turned on, and the control signal is switched to become a ground signal. The first transistor 305 is then turned on by the control signal having a ground potential. Furthermore, since the gate and the channel well of the fifth transistor 425 is coupled to receive the supply voltage Vdd and the ground potential respectively, the fifth transistor 425 is also turned on to provide another signal transmission path paralleled the signal transmission path of the first transistor 305.

When a low logic signal is furnished to the connection pad 301, the low logic signal can be transferred to the internal circuit 380 via the first transistor 305 or the fifth transistor 425. Meanwhile, the low logic signal is also furnished backwards to the gates of the second and third transistors 310, 315, which will turn on the second transistor 310 and turn off the third transistor 315. Under such circumstance, the low logic signal is also furnished to the gate of the first transistor 305 via the second transistor 310. That is, the control signal can be the ground signal furnished via the fourth transistor 320 or the low logic signal furnished via the second transistor 310, which actually forms a self-consistent operation.

When a high logic signal is furnished to the connection pad 301, the high logic signal can be transferred to the internal circuit 380 via the first transistor 305 or the fifth transistor 425. Meanwhile, the high logic signal is also furnished backwards to the gates of the second and third transistors 310, 315, which will turn off the second transistor 310 and turn on the third transistor 315. Under such circumstance, the ground signal is also furnished to the gate of the first transistor 305 via the third transistor 315. That is, the control signal is the ground signal furnished via the fourth transistor 320 or the third transistor 315, which also forms a self-consistent operation. Similarly, the voltage range of the high logic signal is not clamped to within the supply voltage Vdd, which means that a burning signal having a voltage greater than the supply voltage Vdd is allowed to be transferred to the internal circuit 380 via the connection pad 301. In other words, the connection pad 301 is allowed to receive logic signals for logic operations or burning signals for programming operations. For that reason, the ESD avoiding circuit shown in FIG. 4 is also compatible with the internal circuit 380 having programmable functionality.

Likewise, the ESD event is occurred when the connection pad 301, the power terminal 390 and the ground terminal 395 are all floated if they are not grounded. The floating terminal is easy to be coupled to the zero voltage (ground terminal). Accordingly, the first through fifth transistors 305, 310, 315, 320 and 425 are retained in the off state before the occurrence of ESD events. When an ESD event having a positive induced voltage relative to the ground terminal 395 occurs to the connection pad 301 and the positive induced voltage is furnished to the source of the second transistor 310, the second transistor 310 will be turned on due to the floating point. Accordingly, the voltage of the control signal furnished to the gate of the first transistor 305 will become the positive induced voltage. That is, the control signal having the positive induced voltage is fed to the gate of the first transistor 305 so as to retain the first transistor 305 in the off state. Concurrently, the positive induced voltage is furnished to the source of the fifth transistor 425, and the fifth transistor 425 is then retained to hold the off state due to the floating Vdd. That is, the first transistor 305 and the fifth transistor 425 are capable of isolating the positive induced voltage concerning the ESD event for protecting the internal circuit 380 from being damaged. On the other hand, when an ESD event having a negative induced voltage relative to the ground terminal 395 occurs to the connection pad 301 and the negative induced voltage is furnished to the sources of the first transistor 305 and the fifth transistor 425, both the first transistor 305 and the fifth transistor 425 are retained to hold the off state, and the first transistor 305 and the fifth transistor 425 are able to isolate the negative induced voltage concerning the ESD event for protecting the internal circuit 380 from being damaged. When an ESD event having an induced voltage occurs to the power terminal 390 or the ground terminal 395, the operation for isolating the internal circuit 380 from being damaged by the induced voltage is similar to the operation detailed for the integrated circuit 300 in FIG. 3, and for the sake of brevity, further discussion is omitted.

Figure 5:
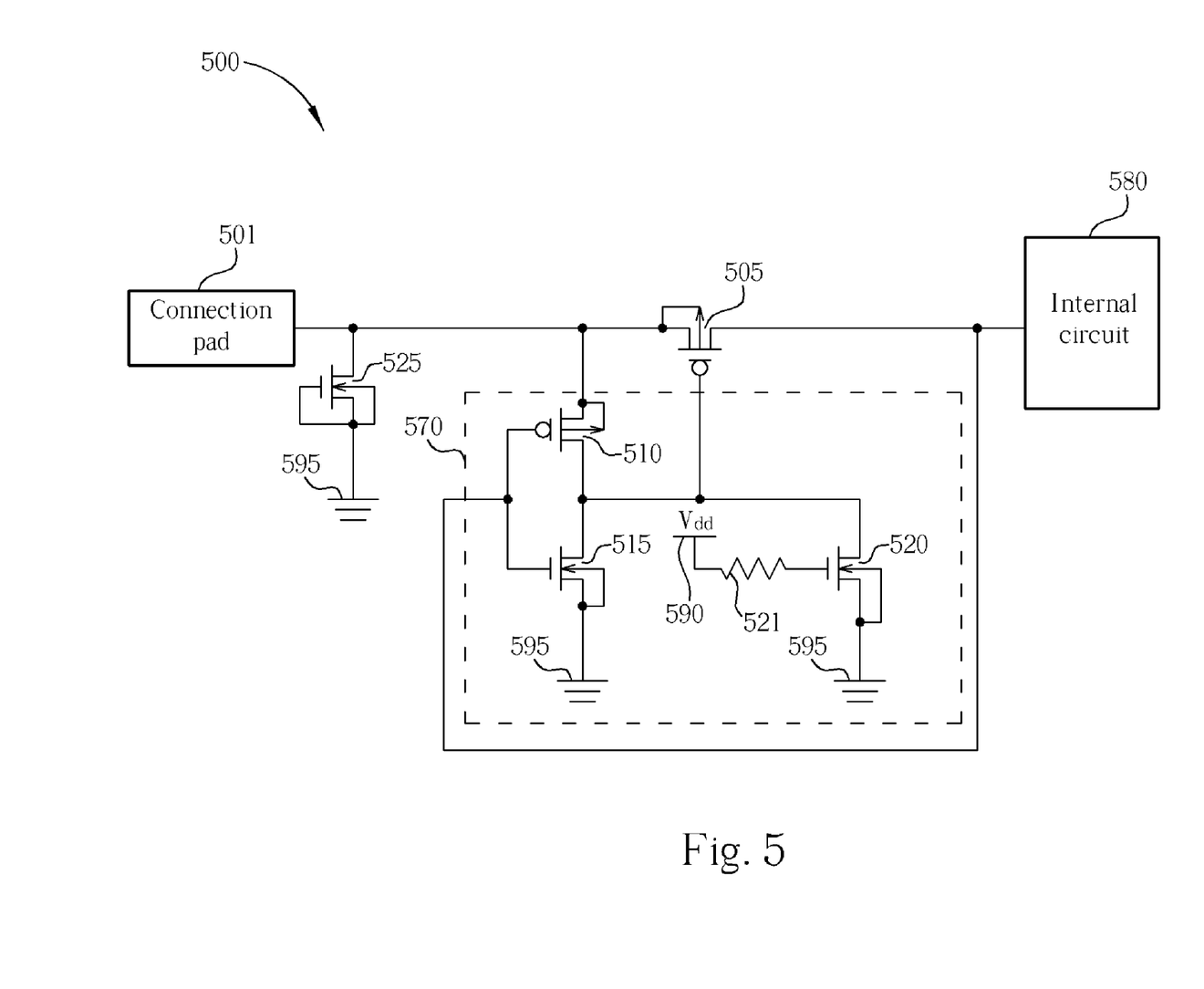
FIG. 5 is a schematic circuit diagram showing the structure of an ESD protection circuit in an integrated circuit in accordance with a first embodiment of the present invention.

Please refer to FIG. 5, which is a schematic circuit diagram showing the structure of an ESD protection circuit in an integrated circuit 500 in accordance with a first embodiment of the present invention. The integrated circuit 500 comprises a connection pad 501, a first transistor 505, an ESD detector 570, a fifth transistor 525 and an internal circuit 580. The ESD protection circuit in FIG. 5 comprises the first transistor 505, the fifth transistor 525 and the ESD detector 570. The ESD detector 570 comprises a second transistor 510, a third transistor 515, a fourth transistor 520 and a resistor 521. The circuit connections concerning the first through fourth transistors 505, 510, 515 and 520, the connection pad 501, the resistor 521 and the internal circuit 580 are similar to the circuit connections detailed for the integrated circuit 300 in FIG. 3, and for the sake of brevity, further description on the same circuit connections is omitted.

The fifth transistor 525 has a drain coupled to the connection pad 501, a source coupled to a ground terminal 595, a gate coupled to the source, and a channel well coupled to the source. The fifth transistor 525 is an NMOS transistor having thick gate oxide layer. The fifth transistor 525 functions to provide a bypass path for discharging ESD induced currents concerning ESD events so as to protect the internal circuit 580 from being damaged.

The operations concerning the ESD protection circuit of the integrated circuit 500 under normal operating situation and under occurrence of an ESD event are described as the following. Under normal operating situation, the power terminal 590 is powered with the supply voltage Vdd, and the ground terminal 595 is grounded. The operations concerning the first through fourth transistors in FIG. 5 are similar to the operations concerning the first through fourth transistors in FIG. 3, and for the sake of brevity, further discussion on the same operations is omitted. When a low logic signal or a high logic signal is furnished to the connection pad 501, the fifth transistor 525 is retained to hold the off state, and the low logic signal or the high logic signal can be transferred to the internal circuit 580 via the first transistor 505. However, when a negative pulse noise occurs to the connection pad 501, the negative pulse noise can be guided to the ground terminal 595 via a parasitic diode structured by the junction between the drain and the channel well of the NMOS transistor 525. That is, the fifth transistor 525 is capable of discharging the negative pulse noise from the connection pad 501 to the ground terminal 595 so as to protect the internal circuit 580 from being damaged under normal operating situation. Furthermore, the voltage range of the high logic signal furnished to the connection pad 501 is not clamped to within the supply voltage Vdd, which means that a burning signal having a voltage greater than the supply voltage Vdd is allowed to be transferred to the internal circuit 580 via the connection pad 501. In other words, the connection pad 501 is allowed to receive logic signals for logic operations or burning signals for programming operations. For that reason, the ESD protection circuit shown in FIG. 5 is compatible with the internal circuit 580 having programmable functionality.

Likewise, the ESD event is occurred when the connection pad 501, the power terminal 590 and the ground terminal 595 are all floated if they are not grounded. The floating terminal is easy to be coupled to the zero voltage (ground terminal). Accordingly, the first through fifth transistors 505, 510, 515, 520 and 525 are retained in the off state before the occurrence of ESD events. When an ESD event having a negative induced voltage relative to the ground terminal 595 occurs to the connection pad 501, the negative charges accumulated at the connection pad 501 can be released to the ground terminal 595 through the parasitic diode of the fifth transistor 525. Alternatively, when the amount of the accumulated negative charges is so great that the accumulated charges cannot be released efficiently via the fifth transistor 525, the negative induced voltage can be transferred to the source of the first transistor 505, and the first transistor 505 is retained to hold the off state for isolating the induced voltage and protecting the internal circuit 580 from being damaged. On the other hand, when an ESD event having a positive induced voltage relative to the ground terminal 595 occurs to the connection pad 501, the positive induced voltage is transferred to the source of the second transistor 510, and the second transistor 510 will be turned on due to the positive induced voltage. Accordingly, the voltage of the control signal furnished to the gate of the first transistor 505 will become the positive induced voltage. That is, the control signal having the positive induced voltage is fed to the gate of the first transistor 505 so as to retain the first transistor 505 in the off state. As a result, the first transistor 505 is able to isolate the positive induced voltage concerning the ESD event for protecting the internal circuit 580 from being damaged.

Furthermore, when an ESD event having a positive induced voltage relative to the connection pad 501 occurs to the ground terminal 595, the positive induced voltage can be transferred to the source of the second transistor 510 via the PMOS of the second transistor 510, and the first transistor 505 can be retained to hold the off state as described above for isolating the positive induced voltage and protecting the internal circuit 580 from being damaged. When an ESD event having an induced voltage occurs to the power terminal 590 or the ground terminal 595, the isolating operations concerning the first through fourth transistors 505, 510, 515 and 525 are similar to the isolating operations detailed for the ESD avoiding circuit in FIG. 3, and for the sake of brevity, further discussion is omitted. In summary, the ESD protection circuit of the integrated circuit 500 provides both the isolating and discharging mechanisms for protecting the internal circuit 580 from being damaged by the ESD events, and furthermore, the ESD protection circuit in FIG. 5 is compatible with the internal circuit 580 having programmable functionality.

Figure 6:
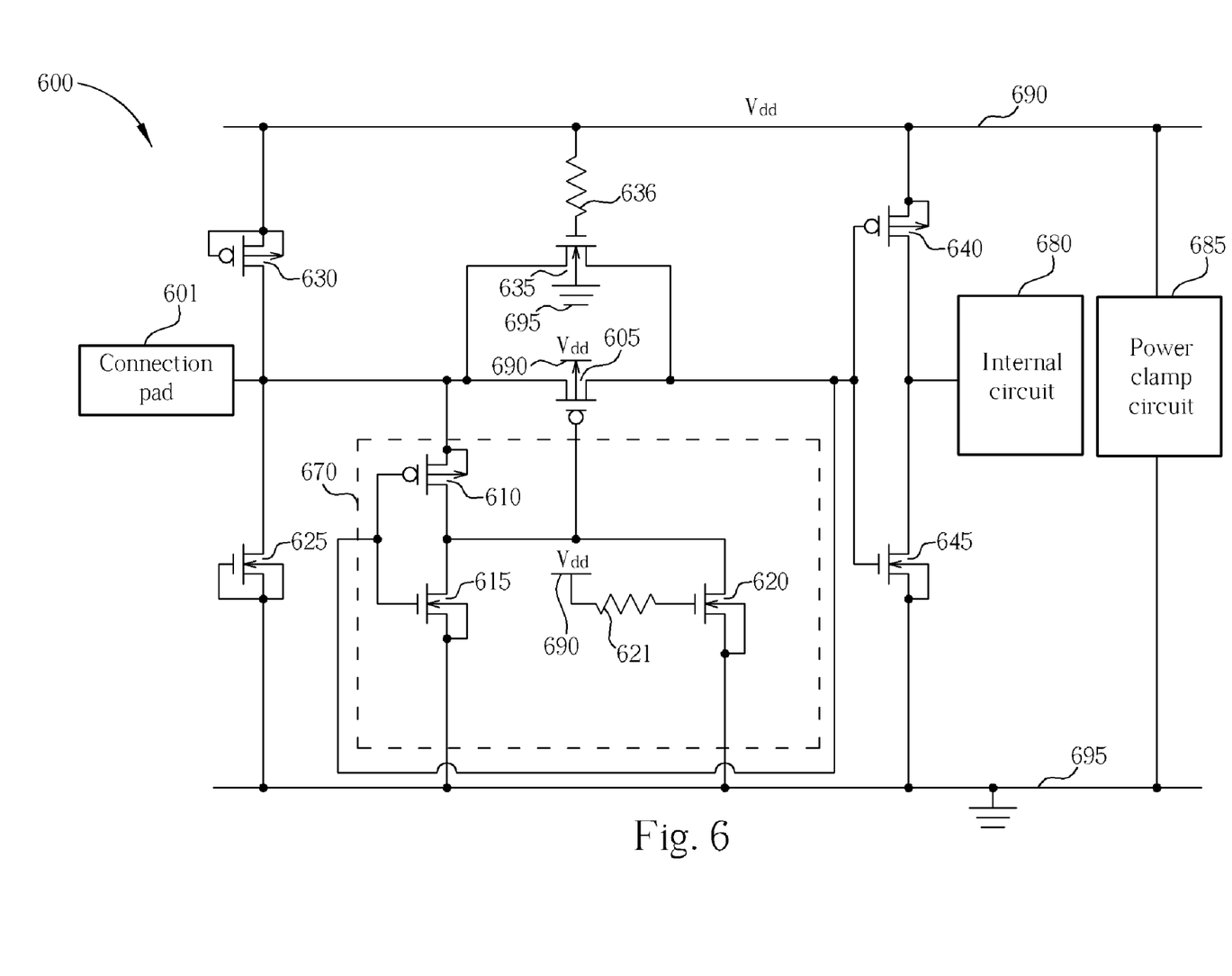
FIG. 6 is a schematic circuit diagram showing the structure of an ESD protection circuit in an integrated circuit in accordance with a second embodiment of the present invention.

Please refer to FIG. 6, which is a schematic circuit diagram showing the structure of an ESD protection circuit in an integrated circuit 600 in accordance with a second embodiment of the present invention. The integrated circuit 600 comprises a connection pad 601, a first transistor 605, an ESD detector 670, a fifth transistor 625, a sixth transistor 630, a seventh transistor 635, an eighth transistor 640, a ninth transistor 645, an internal circuit 680, a power clamp circuit 685 and a resistor 636. The ESD protection circuit in FIG. 6 comprises the first transistor 605, the fifth transistor 625, the sixth transistor 630, the seventh transistor 635, the eighth transistor 640, the ninth transistor 645, the resistor 636, the power clamp circuit 685 and the ESD detector 670. The ESD detector 670 comprises a second transistor 610, a third transistor 615, a fourth transistor 620 and a resistor 621. The power clamp circuit 685 is coupled between a power terminal 690 and a ground terminal 695.

The eighth transistor 640 has a source coupled to the power terminal 690, a channel well coupled to the source, a drain coupled to the internal circuit 680, and a gate. The eighth transistor 640 is a PMOS transistor. The ninth transistor 645 has a source coupled to the ground terminal 595, a channel well coupled to the source, a drain coupled to the internal circuit 680, and a gate coupled to the gate of the eighth transistor 640. The ninth transistor 645 is an NMOS transistor.

The first transistor 605 has a source coupled to the connection pad 601, a drain coupled to the gate of the eighth transistor 640, a gate coupled to the ESD detector 670, and a channel well coupled to the power terminal 690. The first transistor 605 is a PMOS transistor. The seventh transistor 635 has a source coupled to the connection pad 601, a drain coupled to the gate of the eighth transistor 640, a gate coupled to the resistor 636, and a channel well coupled to the ground terminal 695. The seventh transistor 635 is an NMOS transistor. The resistor 636 is coupled between the power terminal 690 and the gate of the seventh transistor 635.

The second transistor 610 has a source coupled to the connection pad 601, a channel well coupled to the source, a gate coupled to the gate of the eighth transistor 640, and a drain coupled to the gate of the first transistor 605. The second transistor 610 is a PMOS transistor. The third transistor 615 has a source coupled to the ground terminal 695, a channel well coupled to the source, a gate coupled to the gate of the eighth transistor 640, and a drain coupled to the gate of the first transistor 605. The third transistor 615 is an NMOS transistor. The fourth transistor 620 has a source coupled to the ground terminal 695, a channel well coupled to the source, a gate coupled to the resistor 621, and a drain coupled to the gate of the first transistor 605. The fourth transistor 620 is an NMOS transistor. The resistor 621 is coupled between the power terminal 690 and the gate of the fourth transistor 620. In a preferred embodiment, the fourth transistor 620 is a MOS transistor having thin or thick gate oxide layer, and the other transistors are MOS transistors having thick gate oxide layer.

The fifth transistor 625 has a drain coupled to the connection pad 601, a source coupled to the ground terminal 695, a gate coupled to the source, and a channel well coupled to the source. The fifth transistor 625 is an NMOS transistor. The sixth transistor 630 has a drain coupled to the connection pad 601, a source coupled to the power terminal 690, a gate coupled to the source, and a channel well coupled to the source. The sixth transistor 630 is a PMOS transistor.

The operations concerning the ESD protection circuit of the integrated circuit 600 under normal operating situation and under occurrence of an ESD event are described as the following. Under normal operating situation, the power terminal 690 is powered with the supply voltage Vdd, and the ground terminal 695 is grounded. The operations concerning the first transistor 605 through the fifth transistor 625 and the seventh transistor 635 are similar to the operations concerning the first transistor 505 through the fifth transistor 525 in FIG. 5 and the fifth transistor 425 in FIG. 4 under normal operating situation, and for the sake of brevity, further discussion on the same operations is omitted.

When a low logic signal or a high logic signal is furnished to the connection pad 601, the fifth transistor 625 and the sixth transistor 630 are retained to hold the off state, and the low logic signal or the high logic signal can be transferred to the internal circuit 680 via the first transistor 605 or the seventh transistor 635. However, when a positive pulse noise occurs to the connection pad 601, the positive pulse noise can be guided to the power terminal 690 via a parasitic diode structured by the junction between the drain and the channel well of the sixth transistor 630. That is, the sixth transistor 630 is capable of discharging the positive pulse noise from the connection pad 601 to the power terminal 690 so as to protect the internal circuit 680 from being damaged under normal operating situation. The eighth transistor 640 together with the ninth transistor 645 functions as an inverter.

Likewise, the ESD event is occurred when the connection pad 601, the power terminal 690 and the ground terminal 695 are all floated. Accordingly, all the transistors 605 through 645 are retained in the off state before the occurrence of ESD events. The operations concerning the first transistor 605 through the fifth transistor 625 and the seventh transistor 635 are similar to the operations concerning the first transistor 505 through the fifth transistor 525 in FIG. 5 and the fifth transistor 425 in FIG. 4 under occurrence of ESD events, and for the sake of brevity, further discussion on the same operations is omitted.

Alternatively, when the amount of the accumulated charges is so great that the accumulated charges cannot be released efficiently via the sixth transistor 630, the positive induced voltage can be transferred to the gate of the first transistor 605 via the second transistor 610, and the first transistor 605 is retained to hold the off state for isolating the induced voltage and protecting the internal circuit 680 from being damaged. The gate oxide layers of the eighth and ninth transistors 640, 645 can also be utilized to protect the internal circuit 680 from being damaged by the accumulated charges directly. The power clamp circuit 685 functions to provide a bypass path between the power terminal 690 and the ground terminal 695 under occurrence of ESD events.

In summary, the ESD protection circuit of the integrated circuit 600 provides both the isolating and discharging mechanisms for protecting the internal circuit 680 from being damaged by the ESD events. Furthermore, when the sixth transistor 630, the eighth transistor 640 and the ninth transistor 645 are removed and the drain and source of the first transistor 605 are coupled directly to the internal circuit 680 and the connection pad 601 respectively, the ESD protection circuit in FIG. 6 is also compatible with the internal circuit 680 having programmable functionality.

Figure 7:
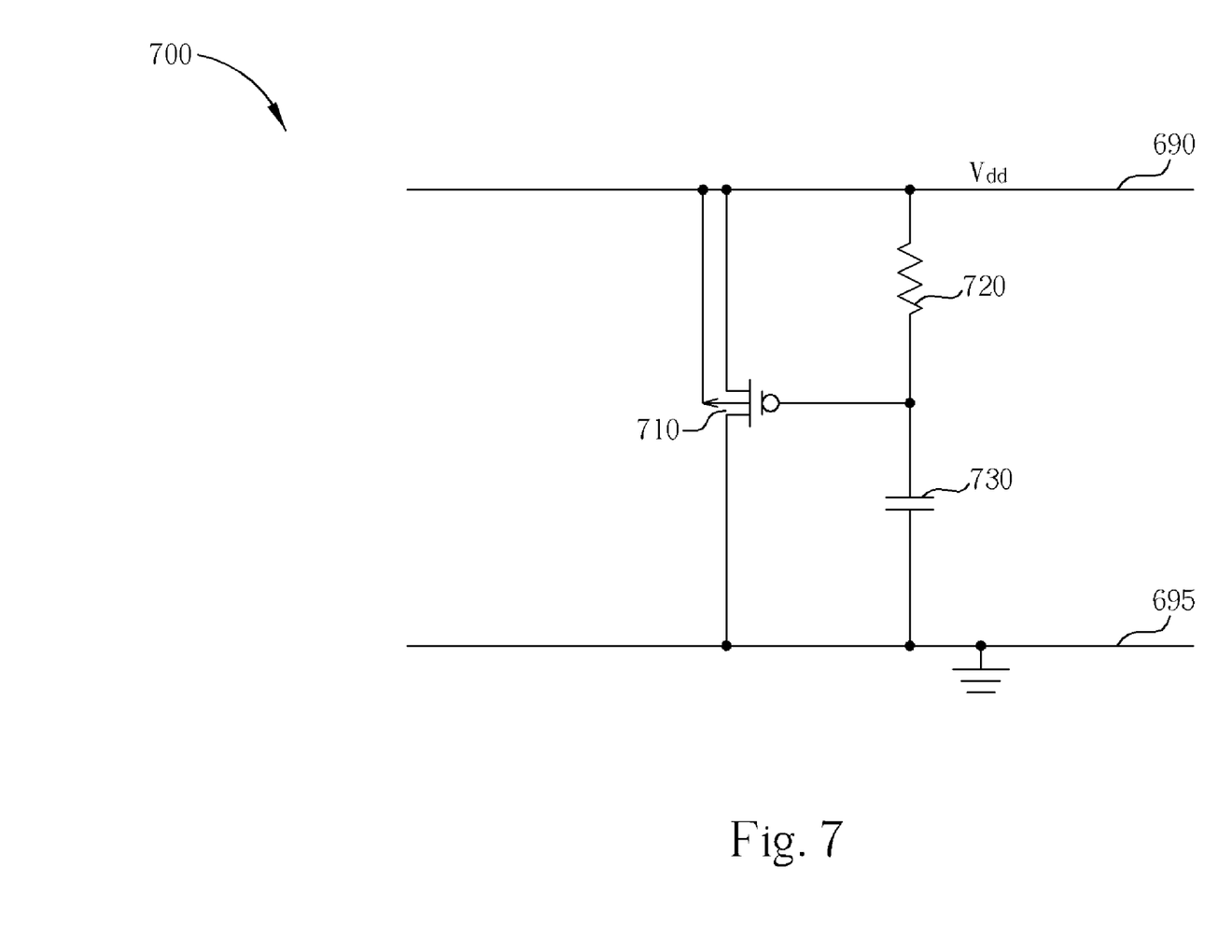
FIG. 7 is a schematic circuit diagram showing a first embodiment of the power clamp circuit in FIG. 6.

Please refer to FIG. 7, which is a schematic circuit diagram showing a first embodiment of the power clamp circuit in FIG. 6. The power clamp circuit 700 comprises a transistor 710, a resistor 720 and a capacitor 730. The resistor 720 and the capacitor 730 are series-connected between the power terminal 690 and the ground terminal 695. The capacitor 730 can be a MOS capacitor or an MIM (metal-insulator-metal) capacitor. The transistor 710 has a drain coupled to the ground terminal 695, a source coupled to the power terminal 690, a channel well coupled to the source, and a gate coupled to a connection node between the resistor 720 and the capacitor 730. The transistor 710 is a PMOS transistor. The power clamp circuit 700 is a well-known prior art, and for the sake of brevity, further discussion is omitted.

Figure 8:
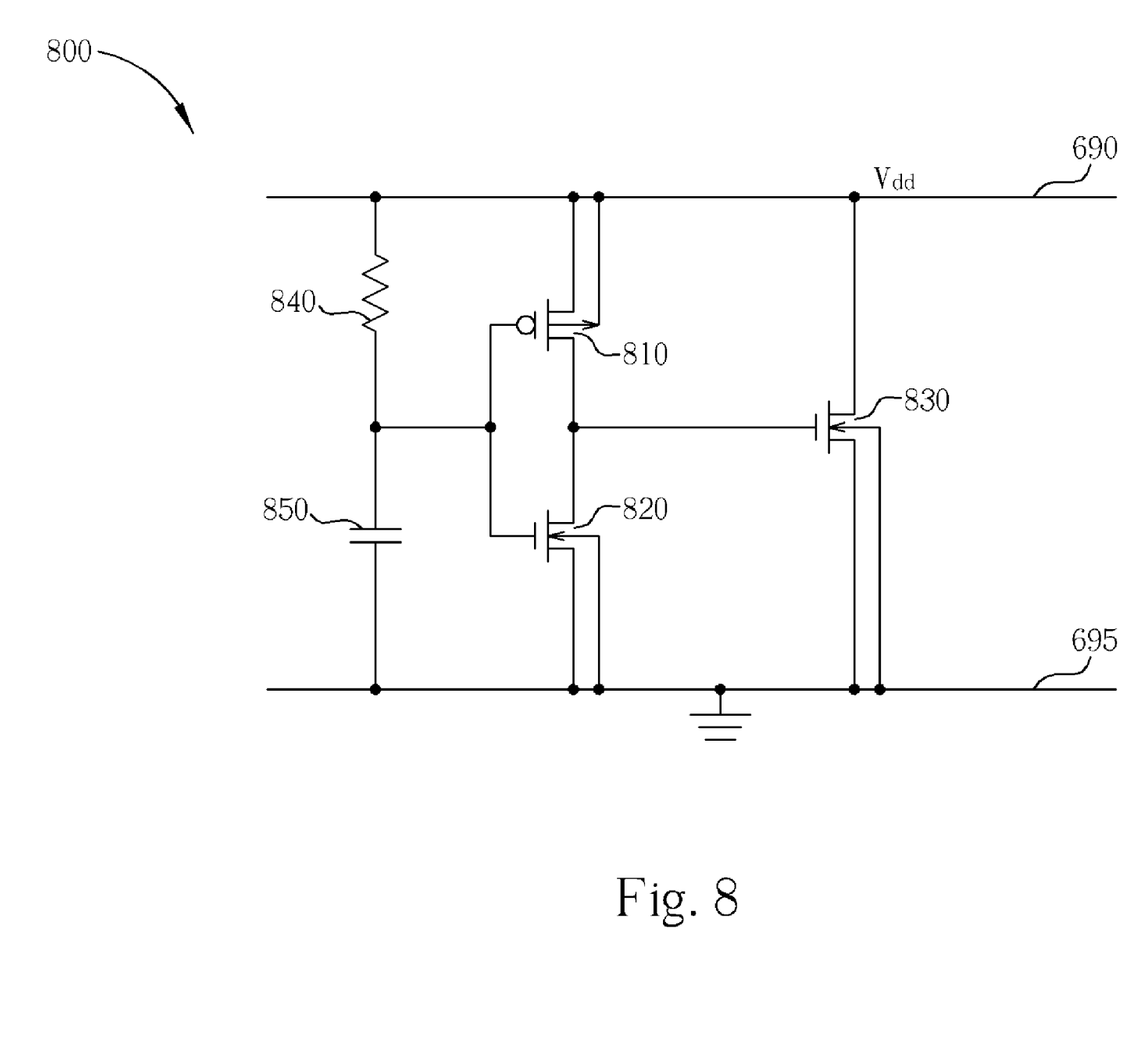
FIG. 8 is a schematic circuit diagram showing a second embodiment of the power clamp circuit in FIG. 6.

Please refer to FIG. 8, which is a schematic circuit diagram showing a second embodiment of the power clamp circuit in FIG. 6. The power clamp circuit 800 comprises a first transistor 810, a second transistor 820, a third transistor 830, a resistor 840 and a capacitor 850. The resistor 840 and the capacitor 850 are series-connected between the power terminal 690 and the ground terminal 695. The capacitor 850 can be a MOS capacitor or an MIM capacitor. The third transistor 830 has a drain coupled to the power terminal 690, a source coupled to the ground terminal 695, a channel well coupled to the source, and a gate. The third transistor 830 is an NMOS transistor. The first transistor 810 has a source coupled to the power terminal 690, a drain coupled to the gate of the third transistor 830, a channel well coupled to the source, and a gate coupled to a connection node between the resistor 840 and the capacitor 850. The first transistor 810 is a PMOS transistor. The second transistor 820 has a source coupled to the ground terminal 695, a drain coupled to the gate of the third transistor 830, a channel well coupled to the source, and a gate coupled to the gate of the first transistor 810. The second transistor 820 is an NMOS transistor. The first transistor 810 together with the second transistor 820 functions as an inverter coupled between the connection node of the resistor 840 and the capacitor 850 and the gate of the third transistor 830. The power clamp circuit 800 is also a well-known prior art, and for the sake of brevity, further discussion is omitted.

To sum up, the ESD avoiding circuit and the ESD protection circuit of the present invention make use of the isolating and/or discharging mechanisms for protecting the internal circuit from being damaged by the ESD events, and furthermore, the ESD avoiding circuit is compatible with the internal circuit having programmable functionality.

Those skilled in the art will readily observe that numerous modifications and alterations of the device and method may be made while retaining the teachings of the invention.

What is claimed is:

1. An ESD avoiding circuit for avoiding passing an electrostatic discharge voltage induced on a connection pad to an internal circuit comprising:
    a first transistor having a source coupled to the connection pad, a drain coupled to the internal circuit, a gate, and a channel well; and
    an ESD detector coupled to the first transistor for providing a control signal to the gate of the first transistor, the ESD detector comprising:
        a second transistor having a source coupled to the connection pad, a channel well coupled to the source, a gate coupled to the internal circuit, and a drain coupled to the gate of the first transistor;
        a third transistor having a source coupled to a ground terminal, a channel well coupled to the source, a gate coupled to the internal circuit, and a drain coupled to the gate of the first transistor; and
        a fourth transistor having a source coupled to the ground terminal, a channel well coupled to the source, a gate coupled to a power terminal, and a drain coupled to the gate of the first transistor.

2. The ESD avoiding circuit of claim 1, wherein the channel well of the first transistor is coupled to the power terminal or the source of the first transistor.

3. The ESD avoiding circuit of claim 1, wherein the first and second transistors are PMOS transistors having thick gate oxide layer, the third transistor is an NMOS transistor having thick gate oxide layer, and the fourth transistor is an NMOS transistor having thin or thick gate oxide layer.

4. The ESD avoiding circuit of claim 1, further comprising:
    a resistor coupled between the power terminal and the gate of the fourth transistor.

5. The ESD avoiding circuit of claim 1, further comprising:
    a fifth transistor having a source coupled to the connection pad, a drain coupled to the internal circuit, a gate coupled to the power terminal, and a channel well coupled to the ground terminal.

6. The ESD avoiding circuit of claim 5, wherein the fifth transistor is an NMOS transistor having thick gate oxide layer.

7. The ESD avoiding circuit of claim 5, further comprising:
    a resistor coupled between the power terminal and the gate of the fifth transistor.

8. The ESD avoiding circuit of claim 5, wherein the channel well of the first transistor is coupled to the power terminal.

9. An ESD protection circuit for protecting an internal circuit against an electrostatic discharge voltage induced on a connection pad comprising:
    a first transistor having a source coupled to the connection pad, a drain coupled to the internal circuit, a gate, and a channel well;
    an ESD detector coupled to the first transistor for providing a control signal to the gate of the first transistor, the ESD detector comprising:
        a second transistor having a source coupled to the connection pad, a channel well coupled to the source, a gate coupled to the internal circuit, and a drain coupled to the gate of the first transistor;
        a third transistor having a source coupled to a ground terminal, a channel well coupled to the source, a gate coupled to the internal circuit, and a drain coupled to the gate of the first transistor; and
        a fourth transistor having a source coupled to the ground terminal, a channel well coupled to the source, a gate coupled to a power terminal, and a drain coupled to the gate of the first transistor; and
    a fifth transistor having a source coupled to the ground terminal, a channel well coupled to the source, a gate coupled to the source, and a drain coupled to the connection pad.

10. The ESD protection circuit of claim 9, further comprising:
    a sixth transistor having a source coupled to the power terminal, a channel well coupled to the source, a gate coupled to the source, and a drain coupled to the connection pad.

11. The ESD protection circuit of claim 10, wherein the sixth transistor is a PMOS transistor.

12. The ESD protection circuit of claim 9, further comprising:
    a sixth transistor having a source coupled to the ground terminal, a channel well coupled to the source, a gate coupled to the drain of the first transistor, and a drain coupled to the internal circuit; and
    a seventh transistor having a source coupled to the power terminal, a channel well coupled to the source, a gate coupled to the drain of the first transistor, and a drain coupled to the internal circuit.

13. The ESD protection circuit of claim 12, wherein the sixth transistor is an NMOS transistor, and the seventh transistor is a PMOS transistor.

14. The ESD protection circuit of claim 9, further comprising:
    a power clamping circuit coupled between the power terminal and the ground terminal.

15. The ESD protection circuit of claim 14, wherein the power clamping circuit comprises:
    a sixth transistor having a source coupled to the power terminal, a channel well coupled to the source, a drain coupled to the ground terminal, and a gate;
    a resistor coupled between the power terminal and the gate of the sixth transistor; and
    a capacitor coupled between the ground terminal and the gate of the sixth transistor.

16. The ESD protection circuit of claim 15, wherein the sixth transistor is a PMOS transistor, and the capacitor is a MOS capacitor or an MIM (metal-insulator-metal) capacitor.

17. The ESD protection circuit of claim 14, wherein the power clamping circuit comprises:
    a sixth transistor having a source coupled to the power terminal, a channel well coupled to the source, a drain, and a gate;
    a resistor coupled between the power terminal and the gate of the sixth transistor;

a capacitor coupled between the ground terminal and the gate of the sixth transistor;

a seventh transistor having a source coupled to the ground terminal, a channel well coupled to the source, a gate coupled to the gate of the sixth transistor, and a drain coupled to the drain of the sixth transistor; and an eighth transistor having a source coupled to the ground terminal, a channel well coupled to the source, a gate coupled to the drain of the sixth transistor, and a drain coupled to the power terminal.

18. The ESD protection circuit of claim 17, wherein the sixth transistor is a PMOS transistor, the seventh and eighth transistors are NMOS transistors, and the capacitor is a MOS capacitor or an MIM capacitor.

19. The ESD protection circuit of claim 9, wherein the channel well of the first transistor is coupled to the power terminal or the source of the first transistor.

20. The ESD protection circuit of claim 9, wherein the first and second transistors are PMOS transistors having thick gate oxide layer, the third transistor is an NMOS transistor having thick gate oxide layer, and the fourth transistor is an NMOS transistor having thin or thick gate oxide layer.

21. The ESD protection circuit of claim 9, further comprising:
a resistor coupled between the power terminal and the gate of the fourth transistor.

22. The ESD protection circuit of claim 9, further comprising:
a sixth transistor having a source coupled to the connection pad, a drain coupled to the internal circuit, a gate coupled to the power terminal, and a channel well coupled to the ground terminal, wherein the sixth transistor is an NMOS transistor having thick gate oxide layer.

23. The ESD protection circuit of claim 22, further comprising:
a resistor coupled between the power terminal and the gate of the sixth transistor.

24. The ESD protection circuit of claim 22, wherein the channel well of the first transistor is coupled to the power terminal.

\* \* \* \* \*